United States Patent
Vicisano et al.

(10) Patent No.: US 9,602,343 B1
(45) Date of Patent: Mar. 21, 2017

(54) SYSTEM AND METHOD FOR ESTABLISHING CONNECTION WITH NETWORK CONTROLLER

(71) Applicant: Google Inc., Mountain View, CA (US)

(72) Inventors: Lorenzo Vicisano, Berkeley, CA (US); James Wanderer, Palo Alto, CA (US); Steven Padgett, Sunnyvale, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 107 days.

(21) Appl. No.: 14/143,214

(22) Filed: Dec. 30, 2013

(51) Int. Cl.
*H04L 12/28* (2006.01)
*H04L 12/24* (2006.01)
*H04L 12/721* (2013.01)

(52) U.S. Cl.
CPC .......... *H04L 41/0806* (2013.01); *H04L 45/26* (2013.01)

(58) Field of Classification Search
CPC ......... H04L 12/26; H04L 12/28; H04L 12/46; H04L 12/721; H04L 45/28; H04L 45/22; H04L 41/12; H04L 43/10–43/50; H04L 41/08; H04L 41/0803; H04L 43/0811; H04J 1/16; H04J 14/00; H04Q 11/00; G02B 6/24; H04B 17/00; G06F 15/16
USPC ....... 370/217, 235, 250, 251, 390, 392, 248, 370/252, 388, 389, 360, 225, 254, 395.2; 709/217, 245, 250
See application file for complete search history.

(56) References Cited

U.S. PATENT DOCUMENTS

| | | |
|---|---|---|
| 5,021,949 A | 6/1991 | Morten et al. |
| 7,225,244 B2 | 5/2007 | Reynolds et al. |
| 2006/0146723 A1* | 7/2006 | Navada et al. ............... 370/251 |
| 2010/0246577 A1* | 9/2010 | Wu ...................... H04L 41/0677 370/389 |
| 2011/0038255 A1* | 2/2011 | Zhou ..................... H04L 49/557 370/218 |
| 2013/0034104 A1* | 2/2013 | Yedavalli ................ H04L 41/12 370/400 |

(Continued)

FOREIGN PATENT DOCUMENTS

| | | |
|---|---|---|
| CN | 100525291 C | 8/2009 |
| EP | 2422535 A2 | 2/2012 |

(Continued)

OTHER PUBLICATIONS

McKeown et al., "OpenFlow: Enabling Innovation in Campus Networks", 6 pages, Mar. 14, 2008.

(Continued)

*Primary Examiner* — Charles C Jiang
*Assistant Examiner* — Wali Butt
(74) *Attorney, Agent, or Firm* — McDermott Will & Emery LLP (57) ABSTRACT

In a software defined network, dataplane connectivity is established between a computing device in the network and a controller. The computing device receives a probe packet from the controller, and identifies a port of the computing device through which the probe packet was received. The computing device sets a local route for communication with the controller through the identified port. The computing device then establishes a connection with the controller through the local route. This procedure is reiterated to incrementally expand network connectivity to a plurality of network devices.

13 Claims, 6 Drawing Sheets

(56) References Cited

U.S. PATENT DOCUMENTS

| | | | |
|---|---|---|---|
| 2013/0070764 A1* | 3/2013 | Boutros | H04L 49/351 370/390 |
| 2013/0194914 A1* | 8/2013 | Agarwal et al. | 370/225 |
| 2013/0223275 A1* | 8/2013 | Vasseur et al. | 370/254 |
| 2014/0269535 A1* | 9/2014 | Pazhyannur | H04W 40/24 370/329 |
| 2014/0328159 A1* | 11/2014 | Rebella | H04L 41/042 370/218 |
| 2015/0180769 A1* | 6/2015 | Wang | H04L 45/38 370/236 |
| 2015/0222510 A1* | 8/2015 | Vaidya | H04L 43/10 370/242 |

FOREIGN PATENT DOCUMENTS

| | | |
|---|---|---|
| EP | 2621136 A2 | 7/2013 |
| WO | 0110088 A1 | 2/2001 |
| WO | 2008019137 A1 | 2/2008 |
| WO | 2009146300 A1 | 12/2009 |
| WO | 2010121771 A2 | 10/2010 |
| WO | 2013007287 A1 | 1/2013 |

OTHER PUBLICATIONS

OpenFlow Switch Specification, version 1.1.0 Implemented (Wire Protocol 0x02), pp. 1-56, Feb. 28, 2011.

\* cited by examiner

SYSTEM AND METHOD FOR ESTABLISHING CONNECTION WITH NETWORK CONTROLLER

BACKGROUND

In a Software Defined Networking environment, one or more centralized controllers remotely program nodes, such as OpenFlow™ enabled switches, to establish dataplane connectivity. Because as little control logic as possible is typically embedded in the switches, the switches are unable to establish dataplane connectivity without supervision of the controllers. The controllers, however, need some means to communicate with the switches in order to program them, but they cannot rely on the presence of normal dataplane connectivity.

Often, either a Dedicated Control Plane Network or hybrid switches are used to provide dataplane connectivity in such networks. A Dedicated Control Plane Network requires building an additional physical control plane network that connects controllers and controlled switches. The connectivity for the control plane network is often provided by running traditional routing protocols. Such networks result in additional network equipment costs, management costs of the additional equipment and related software, and a possibility that the additional elements can fail. Hybrid switches are a hybrid of OpenFlow™ enabled switches and legacy switches that run traditional distributed routing software. The traditional routing software is configured to provide logical control plane connectivity over the shared data plane network. However, this requires that the switches embed the logic necessary to implement traditional routing protocols. The traditional routing protocols can pose constraints over the system design. For example they can limit the scalability and size of the physical data plane topology. The traditional routing protocols also have a management cost. Moreover, the interaction of the traditional routing protocols and OpenFlow™ can create additional technical challenges.

SUMMARY

The present disclosure provides for using the dataplane network to establish connectivity between controllers and switches.

One aspect of the disclosure provides a method of establishing network connectivity between a computing device in the network and a controller. The method includes receiving, at the computing device, a probe packet from the controller, identifying a port of the computing device through which the probe packet was received, setting, using the computing device, a local route for communication with the controller through the identified port, and establishing, by the computing device, a connection with the controller through the local route.

Another aspect of the disclosure provides a data plane network controller, including a processor and a memory in communication with the processor. The memory stores instructions executable by the processor to identify at least one connected network node that has established connectivity with the controller, identify at least one target network node, the at least one target network node being directly linked to the at least one connected network node, send a probe packet to the at least one target network node through the at least one connected network node, receive a connection request from the at least one target network node through the at least one connected network node, and establish a connection with the at least one target node.

Yet another aspect of the disclosure provides a non-transitory computer readable medium storing instructions executable by a processor for performing a method of establishing connectivity in a data plane network. This method includes receiving a probe packet from a controller, identifying a port of the computing device through which the probe packet was received, setting a local route for communication with the controller through the identified port, and establishing a connection with the controller through the local route.

DETAILED DESCRIPTION

In networks such as software defined networks, where nodes are not programmed with enough logic to establish dataplane connectivity without a controller, the disclosure provides a method for establishing connections between the nodes of the network and the controller. In this method, the controller incrementally establishes connections with nodes that are directly connected to it, and then expands connectivity to further degree nodes using an iterative process.

The controller sends a probe packet to each node that is directly connected to the controller. For example, the probe packet may be a user datagram protocol packet. The probe packet reaches a given directly connected node through one of potentially multiple paths.

Upon receipt of the probe packet, the given node determines through which port the packet was received. The node can then use that port to establish connectivity with the controller. For example, the given node may be programmed with logic to set a local route for the controller towards the port where the probe packet was received.

Upon establishing connectivity, the controller has a session with the given node and teaches the node how to reach neighboring nodes. The nodes directly connected to the controller may then route probe packets from the controller to the neighboring nodes. This process may be reiterated n times, until $n^{th}$ degree nodes have established connectivity with the controller.

In addition to providing control plane connectivity, the above-described method may also be used to establish repair connectivity. For example, following a node or link failure resulting in the loss of control plane connectivity to one or more nodes, such nodes may be reconnected to the controller upon receipt of a probe packet transmitted by the controller through an intermediate node.

Figure 1:
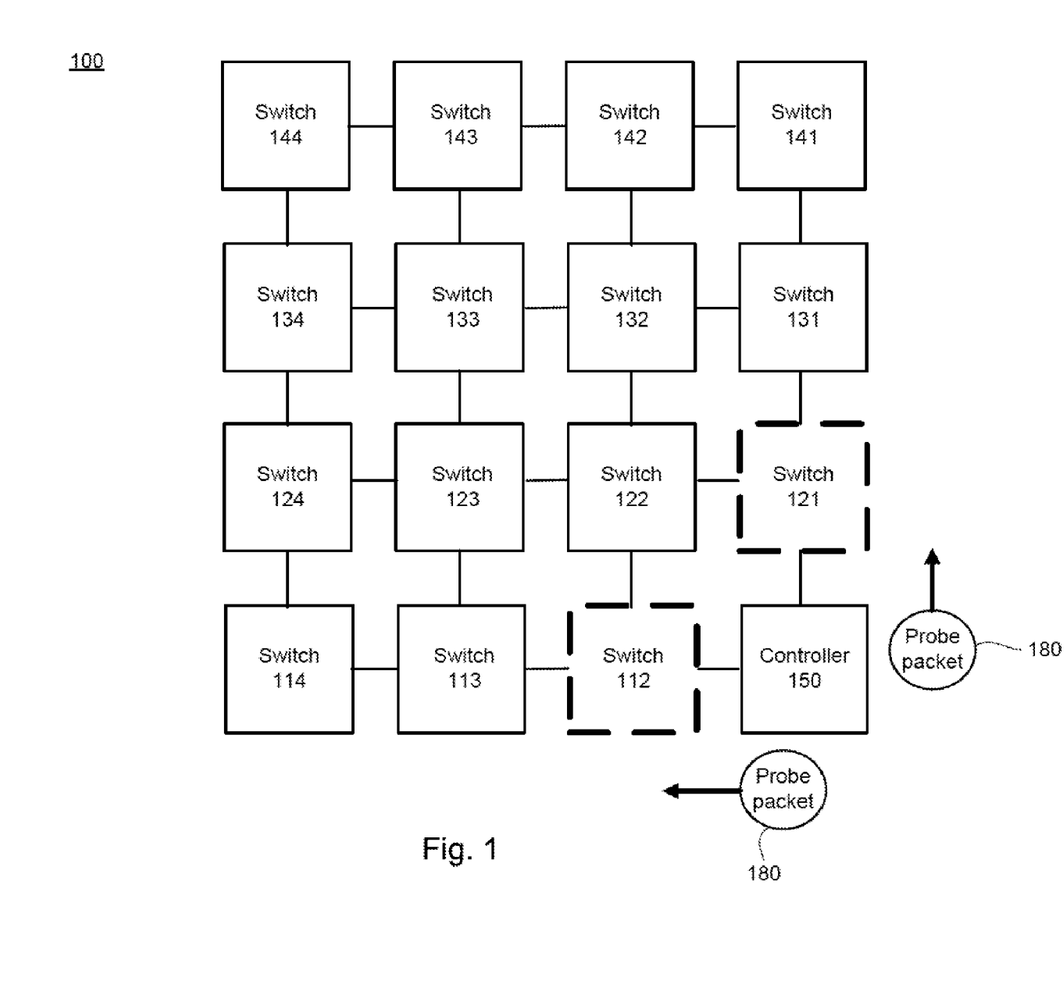
FIG. 1 is a schematic diagram of an example network according to aspects of the disclosure.

FIG. 1 illustrates a network 100, including a controller 150 and switches 112-114, 121-124, 131-134, and 141-144. The network 100 may be, for example, a software defined network. In the network 100, each of the switches 112-114, 121-124, 131-134, and 141-144 are physically connected, directly or indirectly, to the controller 150. Moreover, from each switch there is at least one physical path to reach any other switch. The network 100 may utilize TCP/IP, 802.11, Ethernet, InfiniBand, or any other type of network protocol.

The controller 150 may have prior knowledge of a target topology of the network. Moreover, the controller 150 may be able to identify a current set of switches to gain connectivity with the controller 150. For example, the controller 150 may be configured with information relating to the network topology. According to another example, switches in the network may advertise their presence, for example, through additional protocol machinery.

While only a few switches 112-114, 121-124, 131-134, and 141-144 are shown, it should be understood that the network may be expanded to include any number of switches, for example, to accommodate greater amounts of network traffic. The switches 112-114, 121-124, 131-134, and 141-144 may be any type of switches, routers, chips, spines, or any other device capable of receiving and transmitting packets. According to one example, such as in an OpenFlow™ network, the switches may not be programmed with control logic, and therefore are unable to establish dataplane connectivity without supervision from the controller 150.

The controller 150 sends probe packets 180 to directly connected switches 112 and 121. The probe packets 180 may be, for example, datagram messages, such as user datagram protocol (UDP) packets. In the example where additional protocol machinery is used, the probe packets may be part of the additional protocol machinery. Such packets 180 may include information identifying a source port of the sender and a destination point of a target node. For example, the packets 180 may identify a port of the controller 150 through which the packets are sent, and destination ports of the switches 112, 121. According to one example, such packets 180 may also include information used to program the switches 112, 121 to perform further actions.

Upon receipt of the probe packets 180, switches 112 and 121 may determine through which port the packet 180 was received. For example, the switch 112 may recognize that a packet was received at a given port A (not shown). According to another example, the switches 112, 121 may utilize information in the packet 180 in determining the port through which it was received.

The switches 112, 121 establish a connection with the controller 150 using the port through which the probe packet 180 was received. For example, the switches 112, 121 may be pre-programmed with instructions for establishing the connection upon receipt of the probe packet. As one example, in an Openflow™ network, the control connection may be carried over a TCP/IP session that any machine having a TCP/IP stack is capable of making.

Once the directly connected switches 112, 121 are capable of reaching the controller 150, these switches 112, 121 may be used to expand the connectivity to other nodes of the network 100. An example of this expansion is shown in FIG. 2.

Figure 2:
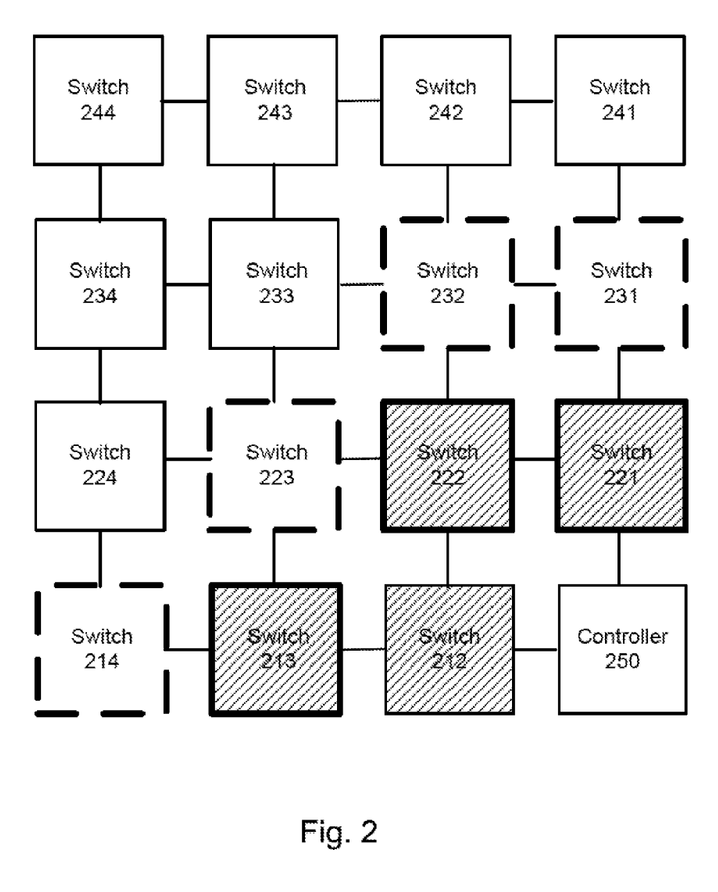
FIG. 2 is another schematic diagram of an example network according to aspects of the disclosure.

FIG. 2 illustrates a network 200 of similar structure to the network 100 of FIG. 1, including control 250 and connected switches 212-214, 221-224, 231-234, and 241-244. In this example, transit switches 212, 213, 221, and 222 have already established connectivity with the controller 250. For example, such connectivity may have been established using the techniques described in connection with FIG. 1. According to another example, the transit switches 212, 213, 221, and 222 may have been manually programmed with logic for reaching the controller 250.

The transit switches 212, 213, 221, and 222 are used in this example to extend connectivity with the controller to target switches 214, 223, 232, and 231. The target switches 214, 223, 232, and 231 are each directly connected to at least one switch that has already established connectivity.

The controller 250 sends a probe packet to each of the target switches 214, 223, 232, and 231. For some of the target switches, multiple paths between the controller 250 and the switch exist. For example, a probe packet destined for the target switch 223 may travel through transit switches 212 and 213, or through transit switches 212 and 222, or through transit switches 221 and 222. The path actually taken by the probe packet may be selected by the controller, for example, based on network topology, which may have been known to the controller or learned dynamically. The controller may program the transit switches with the selected path. According to another example, the controller may select multiple paths to a target switch, and the transit switches may make local decisions on which path to follow. The local decision may be based on, for example, a standard forwarding plane multi-path selection algorithm.

Upon receipt of the probe packet, each of the target switches 214, 223, 232, and 231 sets a local route for the controller 250 through the port where the packet was received. Thus, for example, if the probe packet reached the switch 223 through the switch 213, the switch 223 uses a port linked to the switch 213 to transmit information to the controller 250. Because the switch 213 has already established connectivity with the controller 250 and therefore knows how to reach it, the information sent by the target switch 223 to the switch 213 will reach its destination of the controller 250.

Figure 3:
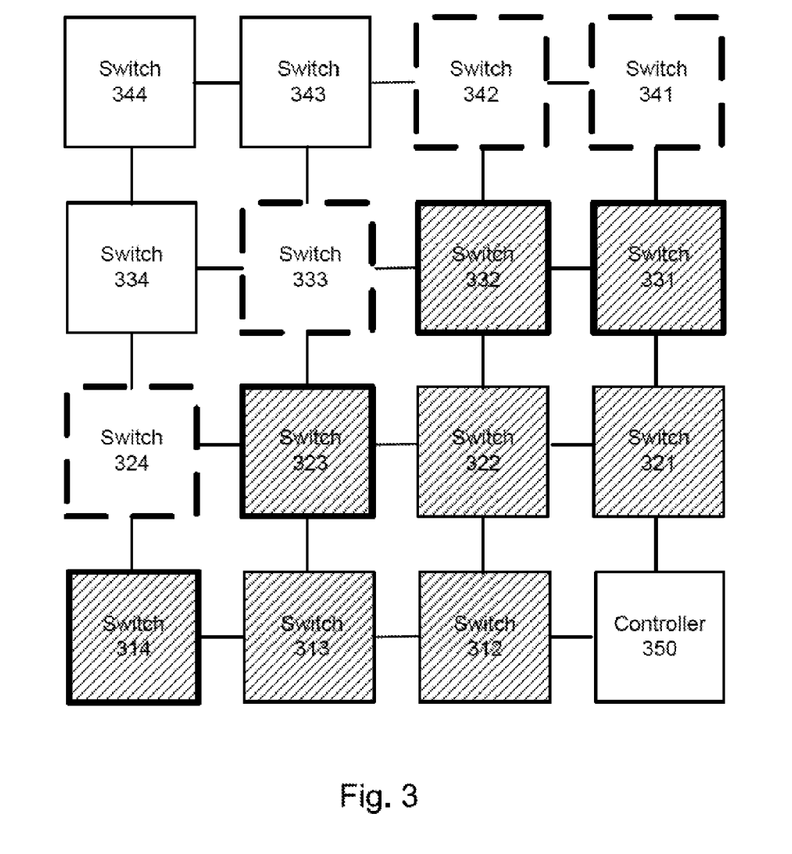
FIG. 3 is another schematic diagram of an example network according to aspects of the disclosure.

As shown in FIG. 3, connectivity between nodes in the network and controller 350 may be established incrementally as target nodes gain connectivity in an expanding ring fashion. For example, switches 314, 323, 332, and 331 have gained connectivity, such as described above. Switches 324, 333, 342, and 341 are then identified by the controller 350 as target nodes. Accordingly, the controller sends probe packets to these new target nodes. Such connectivity may be incrementally established until all switches in the network can reach the controller 350.

Although the examples above describe the probe packets as being targeted to particular switches, in other examples a generic probe packet may be broadcast to the network. While the probe packet may not be received by some switches, the packet can be used by the switches that did receive it. Those switches, in turn, can later transmit the probe packet. If loops result, the loops can be broken using known techniques.

Figure 4:
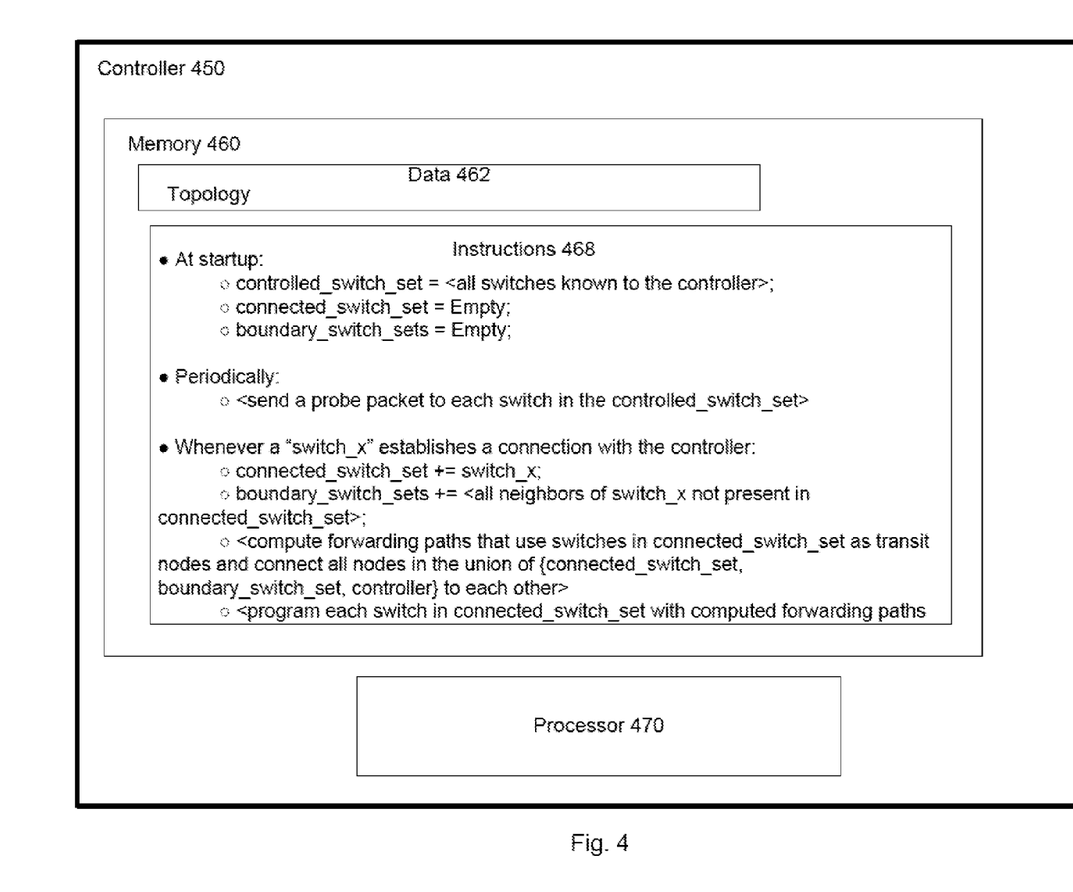
FIG. 4 is block diagram of an example controller according to aspects of the disclosure.

FIG. 4 illustrates an example controller 450. The controller 450 may be any type of computing device capable of transmitting instructions to a switch, for example, using a given protocol. The controller 450 may comprise a memory 460, including data 462 and instructions 468, and a processor 470 coupled to the memory 460.

The memory 460 stores information accessible by processor 470, including instructions 468, and data 462 that may be executed or otherwise used by the processor 470. The memory 460 may be of any type capable of storing information accessible by the processor, including a computer-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 468 may be any set of instructions to be executed directly (such as machine code) or indirectly (such as scripts) by the processor 470. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

The data 462 may include information used to control the routing of packets or other traffic by the switch 122. For example, the data 462 may include topology information regarding a configuration of the switches in the network. For example, this information may indicate how many switches are in the network, how many tiers those switches are arranged in, and which switches are connected to which other switches. Such information may be useful in determining which routes should be used for routing flows through the network.

The data 462 may be retrieved, stored or modified by processor 470 in accordance with the instructions 468. For instance, although the system and method is not limited by any particular data structure, the data may be stored in computer registers, in a relational database as a table having a plurality of different fields and records, XML documents or flat files. The data may also be formatted in any computer-readable format. The data may comprise any information sufficient to identify the relevant information, such as numbers, descriptive text, proprietary codes, references to data stored in other areas of the same memory or different memories (including other network locations) or information that is used by a function to calculate the relevant data.

The processor 470 may be any conventional processor, such as processors in commercially available routers. Alternatively, the processor may be a dedicated controller such as an ASIC or other hardware-based processor. The processor and memory may actually comprise multiple processors and memories that may or may not be stored within the same physical housing. For example, memory may be a hard drive or other storage media located in a server farm of a data center. Accordingly, references to a processor, memory, or computer will be understood to include references to a collection of processors, memories or computers that may or may not operate in parallel.

Instructions 468 may be executed to perform a variety of tasks at various times. For example, as shown by the example pseudo code in FIG. 4, some tasks are performed at startup, some are performed periodically, and some are performed in response to a predetermined event, such as some activity of a given switch.

At startup, a controlled switch set may be defined by all switches known to the controller 450. For example, referring to the example network 100 of FIG. 1, the controlled switch set may include each of the switches 112-114, 121-124, 131-134, 141-144. A set of connected switches that have already established connectivity with the controller may be empty. Boundary switches neighboring the connected switches may also be empty.

Periodically, the controller 450 sends a probe packet to one or more switches in the set of controlled switches. For example, the controller 450 may send the probe packet to switches that are directly connected to the controller, or to switches that are neighbors of switches in the connected set. According to another example, the controller may send probe packets to all switches in the controlled set. In this example, the probe packet may initially only be received by the switches that are neighbors of switches in the connected set. According to yet another example, the controller may send probe packets to every switch, whether in the controller set or the connected set. Upon receipt of the probe packet by the switch, the switch may establish a connection with the controller 450, as described below in connection with FIG. 5. In the example where the probe packets are sent to all switches in the controlled set, switches that did not initially receive the probe packets may eventually receive them as more switches establish connection with the controller.

When a given switch establishes a connection with the controller 450, the controller 450 updates the connected switch set to include the given switch. Moreover, the controller 450 updates the boundary switch set to include all neighbors of the given switch that are not already within the connected switch set. Further, the controller 450 computes forwarding paths between the boundary switches and the controller 450 where the paths include a switch in the set of connected switches. The controller 450 programs the connected switches with such computed forwarding paths, such that the connected switches may expand connectivity to the boundary switches. According to one example, such programming may be performed by the controller 450 using an OpenFlow™ connection.

Figure 5:
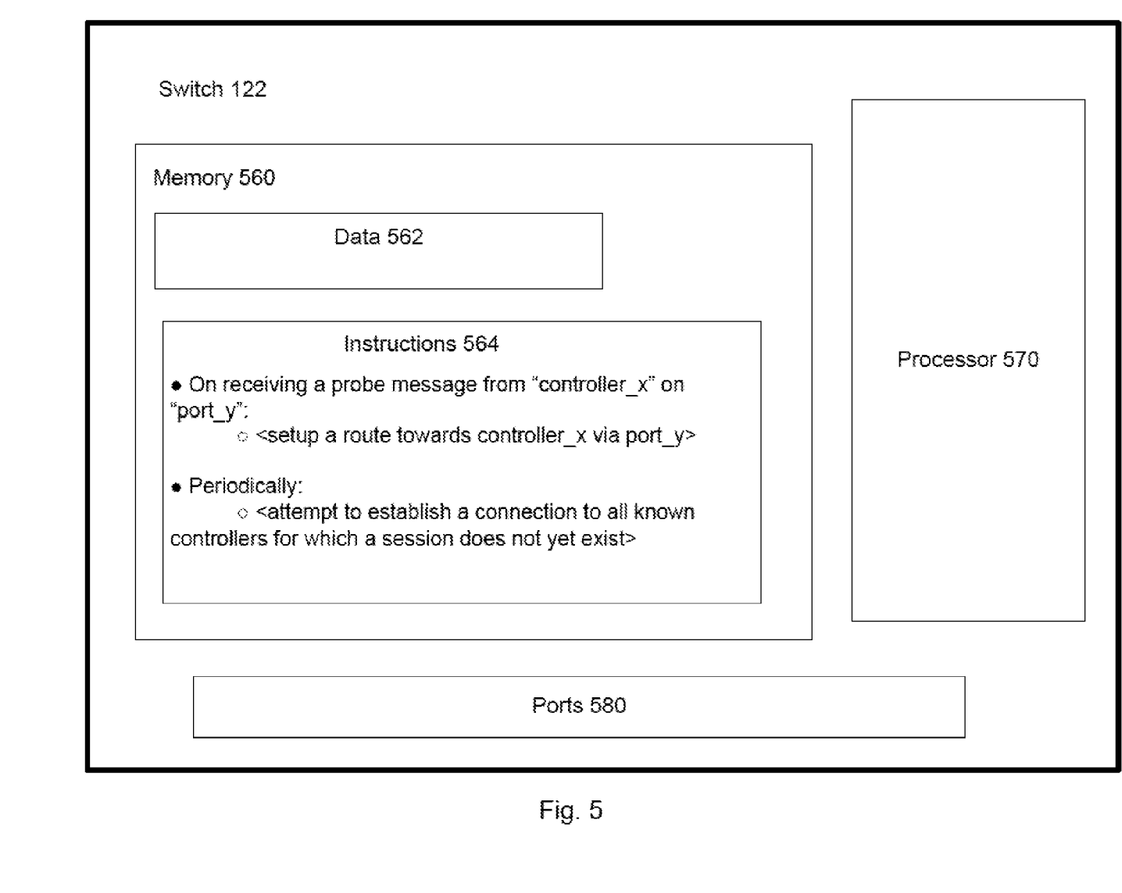
FIG. 5 is block diagram of an example switch according to aspects of the disclosure.

FIG. 5 illustrates an example switch, such as the switch 122 of FIG. 1. Similar to the controller 450, the switch 122 may also comprise a memory 560, including data 562 and instructions 568, and a processor 570 coupled to the memory 560. The switch 122 may also include one or more ports 580, such as uplink data ports and downlink data ports.

Similar to the memory 460 of the controller 450, the memory 560 stores information accessible by processor 570, including instructions 568, and data 562 that may be executed or otherwise used by the processor 570. The memory 560 may be of any type capable of storing information accessible by the processor, and the instructions 568 may be any set of instructions to be executed directly or indirectly by the processor 570. The data 562 may be retrieved, stored or modified by processor 570 in accordance with the instructions 568.

Instructions 568, similar to the instructions 468 of the controller 450, may also perform different tasks at different times. For example, when receiving a probe packet from the controller through a given port, the switch 122 sets up a route towards the controller through the given port. For example, if a switch control element runs a unix-like operating system, it can create a route in its host-networking-stack routing table that matches the IP destination of the controller and directs matching packets to the specified port. Setting the local route to the controller might also involve programming a hardware engine of the switch to match packets directed to the controller and output them to the specified port. As another example, the switch 122 periodically attempts to establish a connection to all known controllers for which a session does not yet exist. For example, using OpenFlow™ on a TCP/IP network, establishing the connection may involve creating a TCP session with the controller and initiating an OpenFlow™ session on top of the TCP session according to the OpenFlow™ specification.

While the components of the switch 122 have been described, it should be understood that a similar architecture may be imparted to any of the other switches in the network 100 (FIG. 1).

Figure 6:
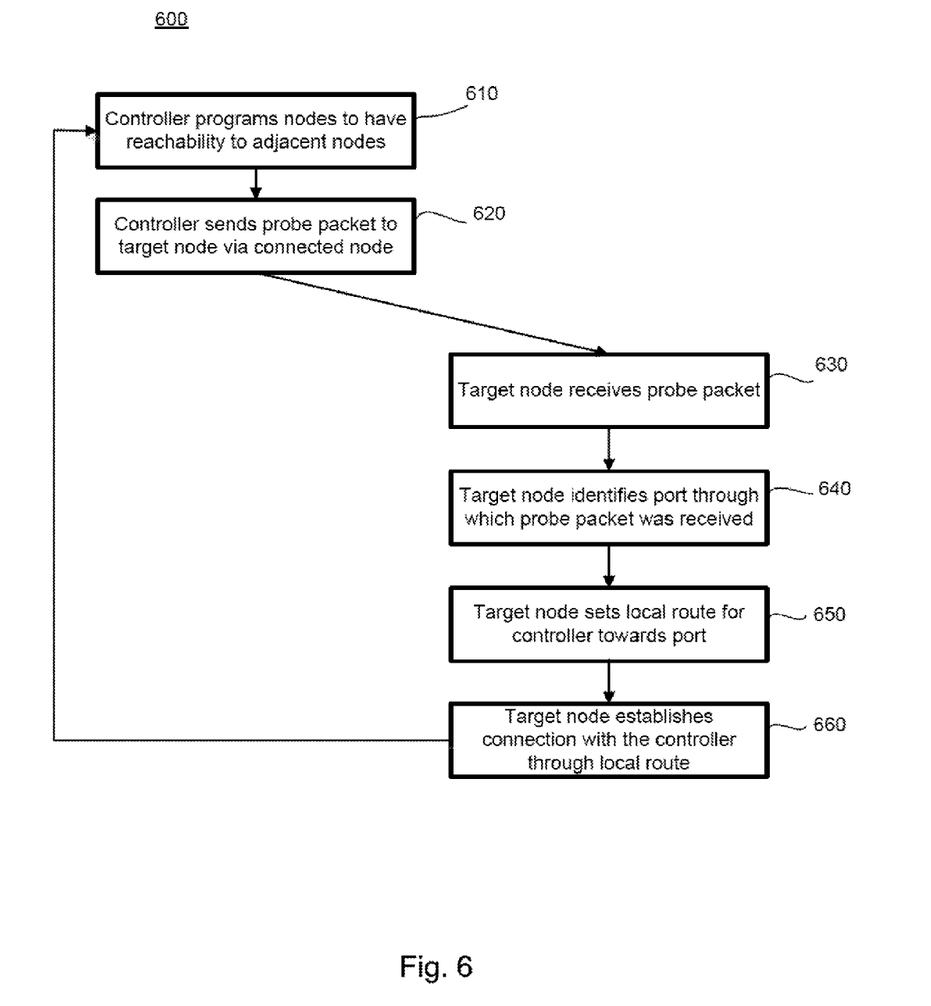
FIG. 6 is a flow diagram of an example method according to aspects of the disclosure.

FIG. 6 is a flow diagram illustrating a method 600 according to aspects of the disclosure. While the description below refers to a number of blocks of the method 600 in a particular order, it should be understood that the order in which the blocks are performed may be modified, and blocks may be added or omitted.

In block 610, the controller programs nodes to have reachability to adjacent nodes. For example, if no switches have yet established connectivity with the controller, the controller provides information to directly linked switches for establishing connection with the controller and programs the directly linked switches to communicate with adjacent switches. For example, the controller may program the directly linked switches with forwarding flows to the adjacent switches. If some switches have already established connectivity with the controller, the controller programs those connected switches to communicate with their adjacent switches.

In block 620, the controller sends probe packets to target nodes via connected nodes. The target nodes may be, for example, the adjacent switches to the connected switches. The packet may be, for example, a default return path signaling message.

In block 630, the target node receives the probe packet. In block 640, the target node identifies which port the probe packet was received through. In block 650, the target node sets a local route for the controller towards the identified port. For example, the adjacent switches may be pre-programmed to set the local route in response to receiving a packet from any controller.

In block 660, the target node establishes a connection with the controller through the local route. For example, the adjacent switches may further be pre-programmed to attempt to establish a connection with all known controllers with which a connection does not already exist.

Upon establishing the connection between the target node and the controller, the method 600 may return to block 610, such that further nodes may establish a connection with the controller. For example, the controller may program the nodes that established a connection in block 660 to have reachability to their neighbors. In this regard, connectivity may be incrementally expanded throughout the network, for example, as described above in connection with FIGS. 1-3.

In addition to establishing connectivity, as discussed above, the foregoing techniques may also be used to repair connectivity, for example, following node and link failures. When a failure causes the loss of control plane connectivity to one or more nodes, these nodes can be reconnected to the controller using the techniques described above.

The above-described aspects may be advantageous in that they provide for establishing network connectivity with minimal or no additional hardware devices, labor, or the like. As such, these aspects provide a significant cost savings. As one example, an expense of an additional physical network to serve as a dedicated control plane network is saved. Such expense includes the cost of network equipment, and management costs for the equipment and related hardware. Moreover, a dedicated control plane network introduces additional elements, which can fail. Accordingly, the present disclosure provides for higher accuracy and reduced down time in a networking environment.

Although the present disclosure makes reference to particular examples, it should be understood that these examples are merely illustrative of the principles and applications of the subject matter of the claims. For example, it should be understood that the described system and method may be implemented over any network, such as the Internet, or any private network connected through a router. For example, the network may be a virtual private network operating over the Internet, a local area network, or a wide area network. Additionally, it should be understood that numerous other modifications may be made to the illustrative examples. For example, while the foregoing examples use Internet Protocol addressing, any other addressing scheme could be used. Similarly, the techniques described above may be applied to nodes in any layer of a network stack. However, these and other arrangements may be devised without departing from the spirit and scope of the subject matter defined by the appended claims.

The invention claimed is:

1. A method of establishing control plane connectivity between a switch and a controller using a data plane network, comprising:
   receiving, at the switch, a probe packet from the controller via the data plane network;
   identifying, by the switch, a port of the switch through which the switch received the probe packet from the controller;
   setting, using the switch, a local route for the switch to communicate with the controller through the identified port;
   establishing, by the switch, the control plane connectivity with the controller through the local route;
   receiving, at the switch, routing information from the controller, the routing information identifying a path for communicating with a neighboring switch with which the controller has not previously established control plane connectivity, and
   establishing control plane connectivity between the controller and the neighboring switch.

2. The method of claim 1, further comprising:
   receiving a second probe packet; and
   forwarding the second probe packet to the neighboring switch using the routing information.

3. The method of claim 1, wherein the routing information comprises at least one forwarding path that uses the switch as a transit node.

4. The method of claim 1, wherein information in the probe packet identifies the controller.

5. The method of claim 4, wherein setting the local route for communication with the controller comprises creating a route having the controller as a destination and directing matching packets to the identified port.

6. The method of claim 1, wherein the probe packet comprises a datagram message.

7. A non-transitory computer readable medium storing instructions executable by a processor for performing a method of establishing control plane connectivity between a switch and a controller using a data plane network, the method comprising:
   receiving, at the switch, a probe packet from the controller via the data plane network;
   identifying, by the switch, a port of the switch through which the switch received the probe packet from the controller;
   setting, using the switch, a local route for the switch to communicate with the controller through the identified port;
   establishing, by the switch, the control plane connectivity with the controller through the local route;

receiving, at the switch, routing information from the controller, the routing information identifying a path for communicating with a neighboring switch with which the controller has not previously established control plane connectivity, and establishing control plane connectivity between the controller and the neighboring switch.

8. The non-transitory computer readable medium of claim 7, the method further comprising:

receiving a second probe packet; and forwarding the second probe packet to the neighboring switch using the routing information.

9. The non-transitory computer readable medium of claim 7, wherein the routing information comprises at least one forwarding path that uses the switch as a transit node.

10. The non-transitory computer readable medium of claim 7, wherein information in the probe packet identifies the controller.

11. The non-transitory computer readable medium of claim 10, wherein setting the local route for communication with the controller comprises creating a route having the controller as a destination and directing matching packets to the identified port.

12. The method of claim 1, wherein the switch receives the probe packet from a neighboring switch.

13. The non-transitory computer readable medium of claim 7, wherein the switch receives the probe packet from a neighboring switch.

* * * * *